Aug. 15, 1950     O. K. REINHARDT     2,519,053
FLAT DRY BATTERY

Filed May 28, 1947     2 Sheets—Sheet 1

INVENTOR
OTTO K. REINHARDT
BY
*Pennie, Edmonds, Morton and Barrows*
ATTORNEYS

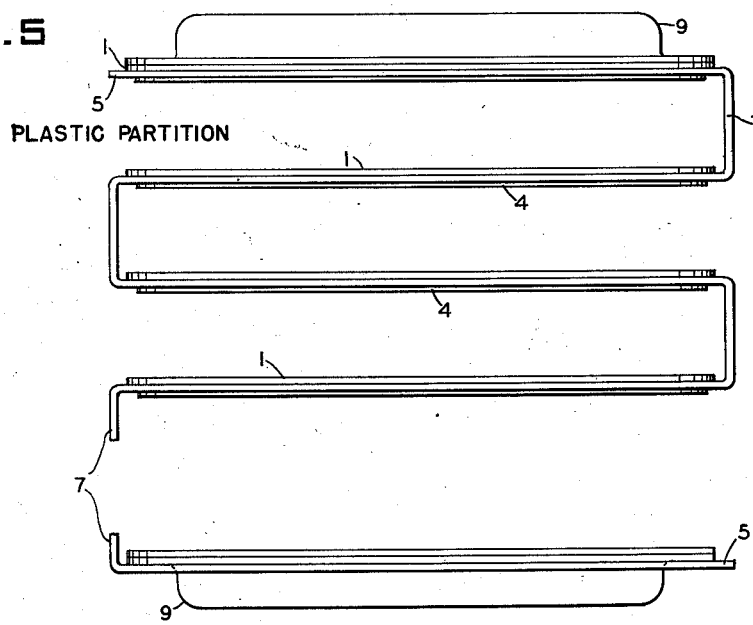
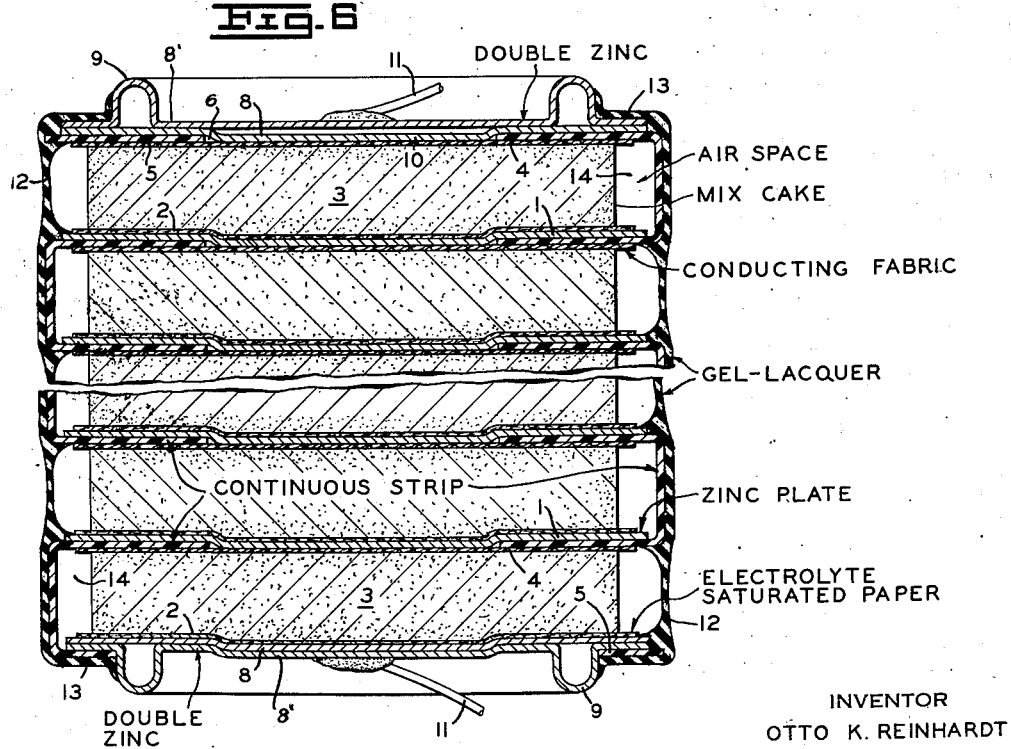

Patented Aug. 15, 1950

2,519,053

UNITED STATES PATENT OFFICE 2,519,053

FLAT DRY BATTERY

Otto K. Reinhardt, New Haven, Conn., assignor to Olin Industries, Inc., New Haven, Conn., a corporation of Delaware Application May 28, 1947, Serial No. 751,041

6 Claims. (Cl. 136—111)

This invention relates to primary batteries and more particularly to batteries of the "flat type" consisting of a number of cells formed of flat elements.

In the earlier types of flat battery, the flat elements were arranged in proper order to produce a battery of the desired number of cells and then wrapped with tapes or the like, while under compression, to keep the elements in intimate contact with each other. Instead of wrapping the assembly with tapes, it was sometimes placed in a container and suitable wedges arranged in the space between the ends of the battery and the inside walls of the container to place them under compression. In either instance, the battery after being placed in the container, and while under compression, was surrounded by a suitable plastic material which was poured into the container, while in liquid or semi-liquid form, to fill the voids and then solidify, to retain the electrolyte in place.

Another type of flat battery consists of separate groups of flat elements, which may or may not form complete cells, but in which the peripheral margin of certain groups of elements, are covered with an integument to insulate the electrolyte in the respective cells, and the entire battery held in compression by binding tapes or the walls of the container in which it is confined. In these constructions the groups of elements are incapable of maintaining the desired pressure for purposes of electric contact without additional means, such as the aforesaid tapes or container wall.

It has also been proposed to construct a battery in which groups of flat elements are arranged in tray-like containers having open tops and partially open bottoms to permit contact between the adjacent elements. The depth of these trays is greater than that of the group of elements contained therein so that the side walls of the trays overlap when a number of them are nested to form a battery. In the constructions heretofore proposed, the side walls of the trays have either been tapered or stepped to permit nesting of the containers when assembled to form a battery.

In the copending application of Carl J. Krachenfels, Serial No. 750,962, filed May 28, 1947 there is disclosed and claimed a flat battery consisting of substantially flat cell elements arranged in proper order to form a plurality of cells with partitions consisting of sheets of plastic material, separating the cells from each other and with a jacket of plastic material surrounding the battery, the jacket being formed by immersing the battery in a solution of a gel lacquer at a temperature at which the lacquer is liquid and then permitting the battery, after removal, to stand at room temperature to cause gelling of the jacket.

In the co-pending application of William B. Woodring, Serial No. 750,955, filed May 28, 1947, there is disclosed a similar type of battery in which the partition members are conductive and serve as combined partitions and cathodes.

The invention herein disclosed consists of an improvement on the Krachenfels battery to facilitate the assembly operation. I also employ a plurality of substantially flat cell elements, and a partition consisting of a plastic sheet between the cells and dip the assembled battery in a solution of a gel lacquer to form the outer casing. Instead of providing an individual sheet of plastic material as the partition for each pair of adjacent cells, I employ a strip or ribbon of such material having spaced openings to receive the anode and cathode of adjacent cells and permit these cells to be electrically connected to each other. I cement the alternate electrodes to the plastic ribbon, and to each other through the openings in the ribbon, and then fold the ribbon so that one side of the fold presents a zinc electrode and the other side of the fold presents a carbon electrode. The paper liner and mix cakes are then inserted to complete the structure of each cell. The assembly is then placed in a suitable clamp under compression and dipped in a gel lacquer at a temperature which maintains the lacquer liquid. It is then removed from the lacquer solution and kept at room temperature for a period of time sufficient to permit gelling of the lacquer and drying of the solvent.

In the accompanying drawings, I have shown one embodiment of the invention. In this showing:

Fig. 5 is a side elevation of the strip, with the electrodes cemented thereto, folded for the reception of the liners and mix cakes; and Fig. 6 is a sectional view of the complete battery.

Figure 1:
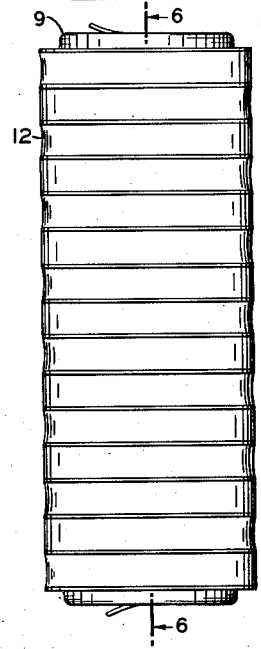
Fig. 1 is an elevation of a completed battery.
Figure 2:
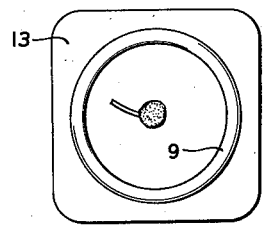
Fig. 2 is a plan view of the battery.

Referring first to Fig. 6 of the drawings, the battery consists of a plurality of cells, each of which includes a substantially flat zinc anode 1, an electrolyte saturated absorbent paper 2, a mix cake 3 of depolarizing material, and a cathode member 4. The partitions between adjacent cells are formed of a strip 5 of plastic material which is of a width equal to a dimension of the battery and this strip is provided with a plurality of spaced openings 6. The strip is adapted to be folded as shown in Fig. 5 of the drawings and the distances between the center of the openings is equal to a dimension of the battery plus the height of the cell. This provides the section 7 between each pair of partitions proper when the strip is folded as shown in Fig. 5.

Figure 3:
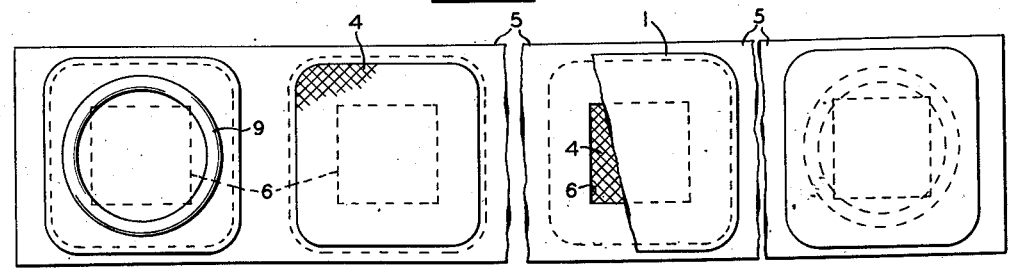
Fig. 3 is a plan view of the plastic ribbon or strip which forms the partition between the cells with the zinc anodes and carbon cathodes cemented thereto.
Figure 4:
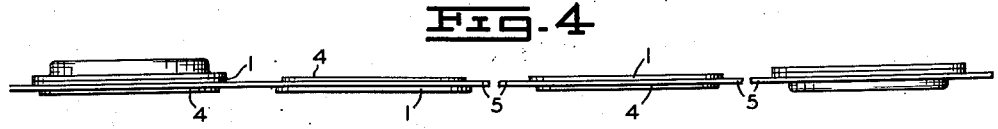
Fig. 4 is a side elevation of the strip shown in Fig. 3.

In constructing a battery, the electrodes are first cemented to the strip 5, and to each other, through the openings in the strip, and the electrodes are alternately arranged on the top and bottom of the strip so that when the strip is folded a carbon cathode and a zinc anode will be arranged within one of the sections for the reception of the liner and mix cake to complete a cell. Referring to Figs. 3 and 4 of the drawings, an anode 1 is cemented to the strip 5 in alignment with the first opening on the top of the strip and a cathode member 4 is cemented to the strip on the bottom, and to the anode through the opening 6 in the strip. As shown, one of the electrodes, illustrated as the anode, is embossed, as indicated at 8, in alignment with the opening 6 to project therethrough so that it will be flush with the other surface of the strip and make good electrical contact with the cathode. At the next opening the electrodes are reversed as indicated in Figs. 3 and 4 and this reversal is carried out throughout the length of the strip so that when the strip is folded, as shown in Fig. 5 of the drawings, a cathode member 4 arranged at one opening is positioned with respect to the anode member 1 at the next opening to receive the liner and mix cake.

At the top and bottom of the battery I preferably provide an extra zinc plate 8' which plates may have beads 9 or other embossments formed thereon to strengthen the battery. At the end of the battery where the cathode member forms the last element of the cell, illustrated in Fig. 6 as the top, I may also provide a zinc plate 10, similar to the anodes, to contact with the cathode. Suitable leads 11 may be soldered or otherwise secured to the zinc plates 8.

The separator 2 is any absorbent paper commonly used in battery constructions provided with a coating of paste on the side adjacent the anode and carries the usual electrolyte. The mix cake 3 consists of a pressed cake of the usual depolarizing mix employed in dry cells. It may thus consist of a mixture of powdered carbon and manganese dioxide with a suitable binder to retain the components in cake form.

The cathode 4 may consist of a strip of cloth or other flexible material impregnated with a carbon paint which forms the cathode. This composition may consist of an elastomer mixed with a conductive paint, such as graphite or acetylene black, or a mixture of the two. It is first dispersed in a suitable solvent, such as a mixture of methyl ethyl ketone and toluene, to a consistency which will readily spread and penetrate the interstices of the fabric. The elastomer may be vinyl chloride-acetate copolymer or polyvinyl butyral compositions of the thermoplastic or thermosetting variety or copolymers of vinylidene chloride with vinyl chloride.

The surface of the anode in engagement with the plastic partition and the surface of the cathode in engagement with the plastic partition are coated with a conductive cement which consists of a mixture of a conductive pigment, such as graphite or acetylene black, or a mixture of the two, dispersed in any suitable solvent, such as a mixture of a ketone or an ester or mixtures thereof containing a thermoplastic cement admixed therewith. The cement may be any of the electrically conductive rubber compositions formed of natural rubber or synthetic elastomers. The anode and cathode are sealed to the plastic partition by this cement and to each other, thus electrically connecting the anode of one cell to the cathode of the adjacent cell.

After the strip or ribbon 5 has been shaped, as shown in Fig. 5 of the drawings, the liners and mix cakes are inserted and the battery is then placed in a clamp which will maintain the assembled elements under compression and dipped in a gel lacquer. It is dipped in the lacquer with the axis of the battery, perpendicular to the cell elements, arranged horizontally. While partially submerged in the lacquer, the battery is rotated and a jacket, consisting of side walls 12 and top and bottom portions 13 is formed on the battery. The rotation is continued after the coated stack is removed from the solution until the lacquer gels. This produces a uniform coating extending over the sides and a portion of the top and bottom leaving the central portion of the top free of the coating for the reception of the leads 11. The ribbon 5, which forms the partitions, is preferably formed of cellulose acetate butyrate sheet stock which is readily wetted by the gel lacquer.

The gel lacquer consists of plasticized cellulose acetate butyrate dissolved in a mixture of an aromatic hydrocarbon and an aliphatic alcohol of 3 to 5 carbon atoms. I have successfully employed a 20 percent solution of cellulose acetate butyrate molding powder, medium hard grade, dissolved in a mixture of 16 percent isopropanol and 84 percent xylene. The lacquer solution in which the cells are dipped is maintained sufficiently fluid by keeping it at a temperature from 115 to 120° C. The lacquer, however, gels at room temperature and when the battery is removed from the solution and brought to room temperature, the lacquer gels sufficiently firm that it does not flow. Upon evaporation of the solvent a casing or jacket of a thickness of about .010" to .015" is formed. As the lacquer also shrinks upon gelling and drying, the jacket forms a shrink fit and maintains the battery under compression, thus assuring continued good electrical characteristics.

A further advantage is the fact that while a gel lacquer readily wets the plastic partitions 5 and therefore prevents intercell leakage of the electrolyte, it does not wet the depolarizing mixture. Thus on drying, an air space 14 is provided surrounding the mix cake of each cell.

The advantages of such construction over flat batteries fabricated from preformed cell containers will be obvious to those skilled in the art. On test a battery of this construction has shown greater capacity than other constructions of the same size. In the drawings I have illustrated a battery formed of separate anodes and cathodes but it will be apparent that the invention may be readily applied to a flat cell formed with the so-called duplex electrodes such as is disclosed in the Ryder and Huntley Patent No. 1,508,987.

In such construction one face of the electrode is sealed to the plastic partition. Other modifications in the details of construction will be apparent to those skilled in the art.

I claim:

1. A flat battery comprising an assembly of substantially flat cell elements arranged in proper order to form a plurality of cells including mix cakes and partitions arranged between groups of cell elements, the partitions having openings therein, the partitions comprising a continuous strip of non-conducting plastic material extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes and the openings therein being spaced to be arranged in the center portions of the sections between each pair of cells providing contact of adjacent cell elements of the groups through the openings, and a jacket of a single layer of a plastic non-conductive material, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

2. A flat battery comprising an assembly of substantially flat cell elements arranged in proper order to form a plurality of cells including mix cakes and partitions arranged between groups of cell elements, the partitions having openings therein, the partitions comprising a continuous strip of non-conducting plastic material extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes, and the openings therein being spaced to be arranged in the center portions of the sections between each pair of cells providing contact of adjacent cell elements of the groups through the openings, and a jacket of a single layer of cellulose acetate butyrate, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

3. A flat battery comprising an assembly of substantially flat cell elements arranged in proper order to form a plurality of cells including zinc plates forming the anodes of the cells, carbon containing electrodes and mix cakes, and partitions arranged between groups of cell elements, the partitions having openings therein, the partitions comprising a continuous strip of non-conducting plastic material extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes and the openings therein being spaced to be arranged in the center portions of the sections between each pair of cells providing contact of adjacent cell elements of the groups through the openings, and a jacket of a single layer of a plastic non-conductive material, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

4. A flat battery comprising an assembly of substantially flat cell elements arranged in proper order to form a plurality of cells including zinc plates forming the anodes of the cells, carbon containing electrodes and mix cakes, and partitions arranged between groups of cell elements, the partitions having openings therein, the partitions comprising a continuous strip of non-conducting plastic material extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes, and the openings therein being spaced to be arranged in the center portions of the sections between each pair of cells, the zinc anodes being embossed to extend through the openings into contact with the cathodes of the adjacent cells, the electrodes being cemented to the partition strip and to each other by a conductive cement, and a jacket of a single layer of a plastic non-conductive material, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

5. A flat battery comprising an assembly of substantially flat cell elements arranged in proper order to form a plurality of cells including mix cakes and partitions arranged between groups of cell elements, the partitions having openings therein, the partitions comprising a continuous strip of cellulose acetate butyrate extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes and the openings therein being spaced to be arranged in the center portions of the sections between each pair of cells providing contact of adjacent cell elements of the groups through the openings, and a jacket of a single layer of a plastic non-conductive material, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

6. A flat battery comprising an assembly of substantially flat cell elements arranged in proper order to form a plurality of cells including mix cakes and partitions arranged between groups of cell elements, the partitions having openings therein, the partitions comprising a continuous strip of cellulose acetate butyrate extending over the top of the top cell, then over one side of the top cell, then between the bottom of the top cell and the top of the next cell, then over a side of the second cell and between each two cells and over one side of the lower of each two cells and under the bottom of the bottom cell, the partitions being of greater area than the mix cakes and the openings therein being spaced to be arranged in the center portions of the sections between each pair of cells providing contact of adjacent cell elements of the groups through the openings, and a jacket of a single layer of cellulose acetate butyrate, the jacket extending over the sides and portions of the top and bottom of the battery, the jacket being bonded to the edges of the partitions on three sides of each cell and to the strip of material which extends over one side of each cell and spaced from the edges of the mix cakes thereby forming air spaces surrounding the mix cakes.

OTTO K. REINHARDT.

REFERENCES CITED

The following references are of record in the file of this patent:

UNITED STATES PATENTS

| Number | Name | Date |
|---|---|---|
| 1,821,008 | Dittrick et al. | Sept. 1, 1931 |
| 1,916,709 | Zimmerman | July 4, 1933 |
| 2,042,806 | Schulte | June 2, 1936 |
| 2,154,312 | MacCallum | Apr. 11, 1939 |
| 2,272,969 | French | Feb. 10, 1942 |
| 2,416,079 | Anthony | Feb. 18, 1947 |

FOREIGN PATENTS

| Number | Country | Date |
|---|---|---|
| 647,985 | France | Aug. 8, 1928 |
| 269,977 | Great Britain | Apr. 27, 1927 |
| 556,907 | Great Britain | Oct. 27, 1943 |

OTHER REFERENCES

Hamer et al., Trans. Electrochemical Society, volume 90 (1946), pages 449 and 465.